US010387325B2

(12) United States Patent
Yang

(10) Patent No.: US 10,387,325 B2
(45) Date of Patent: Aug. 20, 2019

(54) DYNAMIC ADDRESS TRANSLATION FOR A VIRTUAL MACHINE

(71) Applicant: INTERNATIONAL BUSINESS MACHINES CORPORATION, Armonk, NY (US)

(72) Inventor: Rui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 15/824,110

(22) Filed: Nov. 28, 2017

(65) Prior Publication Data

US 2019/0163643 A1 May 30, 2019

(51) Int. Cl.
*G06F 12/10* (2016.01)
*G06F 12/1027* (2016.01)
*G06F 12/1009* (2016.01)
*G06F 12/02* (2006.01)
*G06F 9/455* (2018.01)

(52) U.S. Cl.
CPC ...... *G06F 12/1027* (2013.01); *G06F 9/45558* (2013.01); *G06F 12/023* (2013.01); *G06F 12/1009* (2013.01); *G06F 2009/45583* (2013.01); *G06F 2212/1044* (2013.01); *G06F 2212/65* (2013.01); *G06F 2212/68* (2013.01)

(58) Field of Classification Search
CPC .............. G06F 12/023; G06F 12/1009; G06F 12/1027; G06F 9/45557; G06F 9/45583
USPC ......................................................... 711/170
See application file for complete search history.

(56) References Cited

U.S. PATENT DOCUMENTS

| 7,310,721 | B2 | 12/2007 | Cohen |
| 8,055,827 | B2 | 11/2011 | Serebrin et al. |
| 8,060,722 | B2 | 11/2011 | Adams et al. |
| 8,650,337 | B2 | 2/2014 | Craddock et al. |
| 9,336,036 | B2 | 5/2016 | Dong et al. |

(Continued)

FOREIGN PATENT DOCUMENTS

| CN | 103793260 A | 5/2014 |
| CN | 104239227 A | 12/2014 |

(Continued)

OTHER PUBLICATIONS

Watanabe et al., "The ELIS interpreter-oriented Lisp-based workstation," ABSTRACT, Proceedings of the 2nd IEEE Conference on Computer Workstations, Mar. 7-10, 1988, Date Added to IEEE Xplore: Aug. 6, 2002, Santa Clara, CA, USA, pp. 1-3.

(Continued)

*Primary Examiner* — Pierre Michel Bataille
(74) *Attorney, Agent, or Firm* — Jordan T. Schiller

(57) ABSTRACT

Method, system, and computer program product for dynamic address translation for a virtual machine are disclosed. The method includes obtaining a memory portion from a memory space, in response to a request for building a shadow dynamic address translation table, wherein the memory space is allocated for at least one guest operation system and wherein the shadow dynamic address translation table includes a mapping between at least one guest logic memory address and at least one host physical memory address. The method further includes building the shadow dynamic address translation table and storing the shadow dynamic address translation table in the memory portion.

17 Claims, 8 Drawing Sheets

(56) References Cited

U.S. PATENT DOCUMENTS

| | | | |
|---|---|---|---|
| 9,384,024 B2* | 7/2016 | Ramakrishnan Nair | ..................... G06F 9/461 |
| 2008/0005447 A1* | 1/2008 | Schoenberg | ........ G06F 12/1036 711/6 |
| 2008/0215848 A1* | 9/2008 | Sheu | ................... G06F 12/1036 711/207 |
| 2009/0210646 A1 | 8/2009 | Bauman et al. | |
| 2010/0333090 A1* | 12/2010 | Wright | ................ G06F 9/45516 718/1 |
| 2013/0067194 A1 | 3/2013 | Craddock et al. | |
| 2014/0181360 A1* | 6/2014 | Greiner | ............... G06F 12/1009 711/6 |
| 2016/0085531 A1* | 3/2016 | Venkatasubramanian | ................... G06F 11/0751 717/153 |

FOREIGN PATENT DOCUMENTS

| | | |
|---|---|---|
| CN | 104750623 A | 7/2015 |
| WO | 2019106491 A | 6/2019 |

OTHER PUBLICATIONS

International Searching Authority, "Notification of Transmittal of the International Search Report and the Written Opinion of the International Searching Authority, or the Declaration," Patent Cooperation Treaty, dated Mar. 14, 2019, 8 Pages, International Application No. PCT/IB2018/059176.

* cited by examiner

DYNAMIC ADDRESS TRANSLATION FOR A VIRTUAL MACHINE

BACKGROUND

Embodiments of the present disclosure generally relate to computer technologies, and particularly to dynamic address translation for a virtual machine.

Virtual machine technology is widely used in computer systems, especially in enterprise class servers. In such a system, a plurality of virtual machines (i.e., guest operation/operating systems) may run independently and simultaneously at the same hardware structure under the management of a hypervisor, which may be an application in host operation system or the host operation system per se. If an application in a virtual machine requests an access for one portion of the system memory, a dynamic address translation from a guest logical memory address to a host physical memory address will be required.

SUMMARY

A first aspect of embodiments of the present disclosure provides a method for dynamic address translation. The method includes obtaining a memory portion from a memory space, in response to a request for building a shadow dynamic address translation table, wherein the memory space is allocated for at least one guest operation system and wherein the shadow dynamic address translation table includes a mapping between at least one guest logic memory address and at least one host physical memory address. The method further includes building the shadow dynamic address translation table and storing the shadow dynamic address translation table in the memory portion.

A second aspect of embodiments of the present disclosure provides a computer system for dynamic address translation. The computer system includes: at least one processor, an assist controller for dynamic address translation, and a memory coupled to the at least one processor and the assist controller. A set of computer program instructions are stored in the memory and executed by the at least one processor and the assist controller, in order to perform a method. The method includes obtaining a memory portion from a memory space, by the at least one processor, in response to a request for building a shadow dynamic address translation table, wherein the memory space is allocated for at least one guest operation system and wherein the shadow dynamic address translation table includes a mapping between at least one guest logic memory address and at least one host physical memory address. The method further includes building, by the assist controller, the shadow dynamic address translation table and storing the shadow dynamic address translation table in the memory portion, by the assist controller.

A third aspect of embodiments of the present disclosure provides a computer program product for dynamic address translation. The computer product includes a computer readable storage medium having program instructions embodied therewith. The computer readable storage medium is not a transitory signal per se. The program instructions are executable by an assist controller to perform a method. The method includes obtaining a memory portion from a memory space, in response to a request for building a shadow dynamic address translation table, wherein the memory space is allocated for at least one guest operation system and wherein the shadow dynamic address translation table includes a mapping between at least one guest logic memory address and at least one host physical memory address. The method further includes building the shadow dynamic address translation table and storing the shadow dynamic address translation table in the memory portion.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
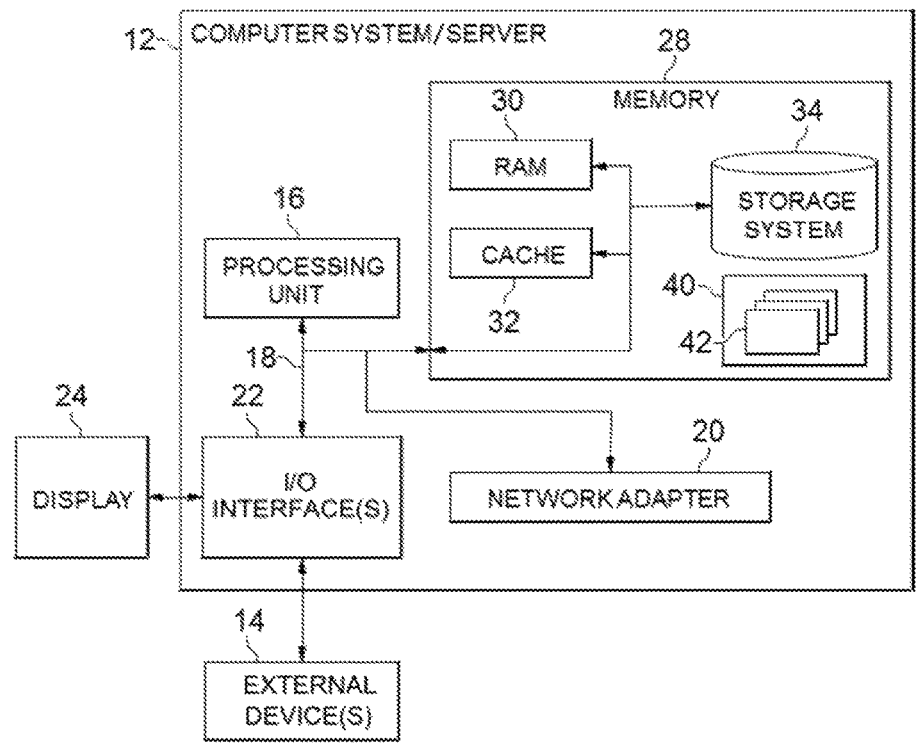
FIG. 1 is a block diagram showing an exemplary computer system which is applicable to implement embodiments of the present disclosure.

Referring now to FIG. 1, in which an exemplary computer system/server 12 which is applicable to implement the embodiments of the present disclosure is shown. FIG. 1 is also adapted to depict an illustrative example of a portable electronic device such as a communication device which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
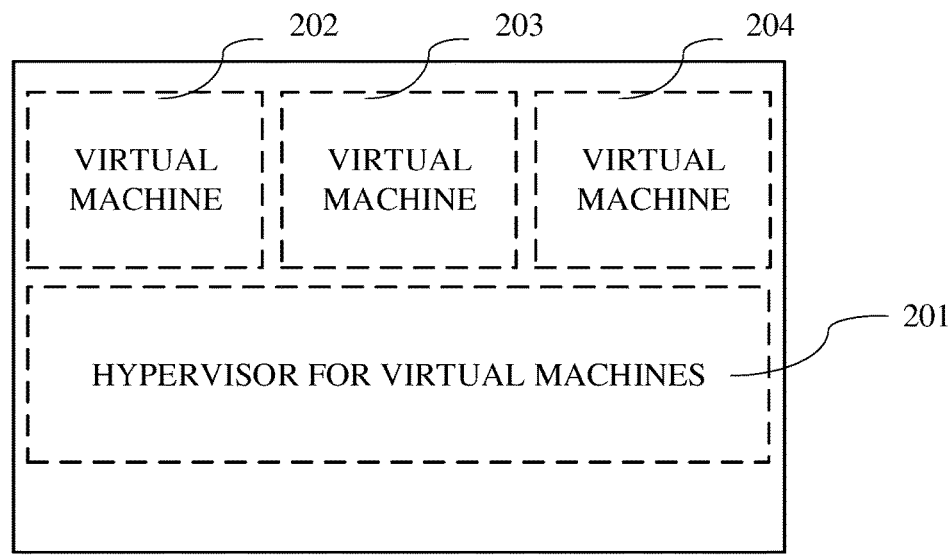
FIG. 2 is a block diagram showing a basic structure of a virtual machine system executable in the computer system, as in FIG. 1, according to an embodiment of the present disclosure.

FIG. 2 is a block diagram showing a basic structure of a virtual machine system executable in a computer system, as in FIG. 1, according to an embodiment of the present disclosure. As shown in FIG. 2, a plurality of virtual machines 202, 203, 204 run independently and simultaneously at the same hardware platform of the computer system/server 12, under the management of a hypervisor 201.

Hardware resources, such as processors, memories, or storage disks in the computer system/server 12 may be assigned to different virtual machines, dynamically or statically. Usually, at least during a certain operation period, the hardware resources assigned to a virtual machine, such as virtual machine 202 are independent, and the access to these assigned hardware resources will not be influenced by other virtual machine, such as virtual machine 203. Namely, the user of virtual machine 202 will not be influenced by the user of virtual machine 203. The utilization of the hardware resources in the computer system, particularly in a large computer system, such as enterprise class server may be improved greatly. Security management for the users may also be implemented accurately, by assigning different authorization to virtual machines respectively.

Figure 3:
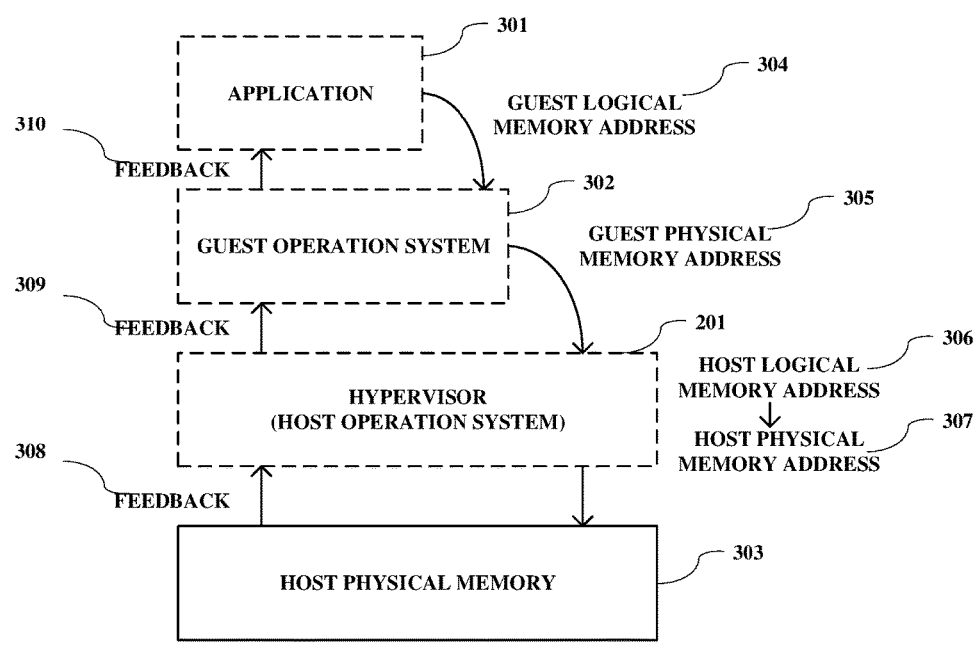
FIG. 3 is an exemplary diagram showing how an application in a virtual machine accesses the physical memory in the hardware platform, according to an embodiment of the present disclosure.

FIG. 3 is an exemplary diagram showing how an application in a virtual machine accesses the physical memory in the hardware platform, according to an embodiment of the present disclosure. As shown in FIG. 3, a user's application 301 requests to access a memory with a guest logical memory address 304. In response to this request, the guest operation system 302 translates the guest logical memory address 304 to a guest physical memory address 305. The translation may be implemented by searching a guest dynamic address translation table, which includes a mapping between a guest logical memory address and a guest physical memory address. The guest physical memory address 305 is transmitted to the hypervisor 201. For example, the hypervisor 201 may be a management application running under a host operation system, or may be the host operation system per se. The hypervisor 201 obtains a host logical memory address 306 based on the guest physical memory address 305. For example, the guest physical memory address 305 may be the host logical memory address 306 per se. Namely, a guest physical memory address 305 may be used as a host logical memory address 306 directly. The hypervisor 201 searches a host dynamic address translation table, which includes a mapping between a host logical memory address 306 and a host physical memory address 307, to translate the host logical memory address 306 to a host physical memory address 307. The host physical memory address 307 is usable to access the host physical memory 303 in the memory 28 of the computer system/server 12. Then, feedbacks, such as 308, 309, and 310, including data or access result would be got by the hypervisor 201 and then returned to the guest operation system 302, and the user's application 301 in sequence.

During these translations of the memory addresses, CPU has to be interrupted, and changes between a guest state to run guest operation system and a host/kernel state to run host operation system. The interruption of CPU is very time-consuming. Further, since the applications usually provide a plurality of requests in a short time, the above-mentioned process is cycled repeatedly, making the burden of CPU much heavier.

In an I/O operation with mass data exchange, the user's application may request an I/O buffer for the purpose of DMA (direct memory access). A shadow dynamical address translation table, including a mapping between the guest logical memory addresses 304 of the I/O buffer and the corresponding host physical memory addresses 307 may be built, and sent to a DMA controller. The DMA controller may access the host physical memory directly using the shadow dynamical address translation table, so as to release the central processing unit (CPU), which may be a processor in the processing unit 16.

Under this solution, the user's application 301 may request the CPU to build the shadow dynamical address translation table before the I/O operation. Further, a portion of the system memory to be accessed may be pinned so as to avoid being swapped from memory onto the hard disk. Then, during the I/O operation, the DMA controller may access the host physical memory. After the I/O operation is finished, the user's application 301 may request the CPU to destroy/unregister the shadow dynamical address translation table. Translations from a plurality of guest logical memory addresses to a plurality of host physical memory addresses are finished by the CPU in one time. Thus, during the I/O operation, CPU needs not to be intercepted.

However, every time user's application requests to build/register, destroy/unregister or amend/refresh a shadow dynamical address translation table, the CPU will be intercepted to switch from the guest state to the host/kernel state. These changes of state and its associated context still require many CPU cycles, especially when a user's application in a guest operation system frequently requests to refresh the shadow dynamical address translation table after every I/O operation.

Figure 4:
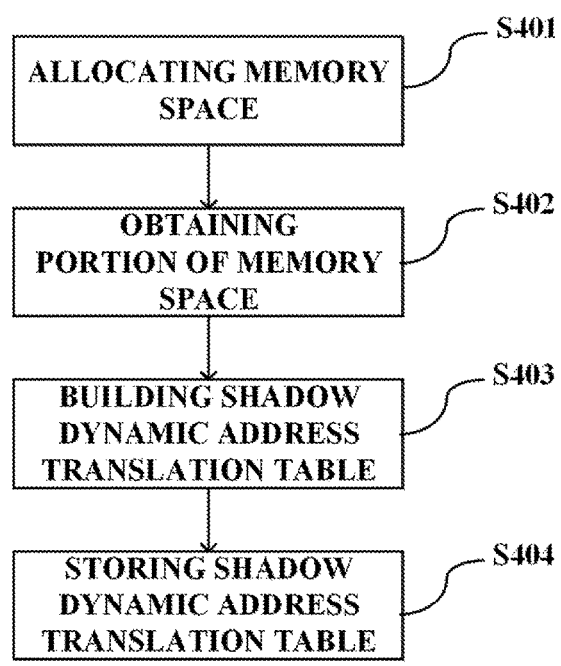
FIG. 4 is a flow chart showing a method for dynamic address translation for a virtual machine, according to an embodiment of the present disclosure.

FIG. 4 is a flow chart showing a method for dynamic address translation for a virtual machine, according to an embodiment of the present disclosure. As shown in FIG. 4, in step S401, a memory space is allocated, for at least one guest operation system. In step S402, in response to a request for building a shadow dynamic address translation table, a memory portion is obtained from the memory space. This may be done without switching to a host state. The shadow dynamic address translation table includes a mapping between at least one guest logic memory address and at least one host physical memory address. In step S403, the shadow dynamic address translation table is built. In step S404, the shadow dynamic address translation table is stored in the memory portion. The allocated memory space may be accessed by any processor or controller other than CPU, such as an assistant controller, for the purpose of building or accessing the shadow dynamic address translation table, without switching to a host state. Thus, the CPU need not to be interrupted for building or accessing the shadow dynamic address translation table, and the burden of CPU may be further reduced.

The method for dynamic address translation for virtual machine may further include a step S405. In step S405, in response to a request for destroying the shadow dynamic address translation table, the memory portion occupied by the shadow dynamic address translation table is returned to the memory space. The return of the occupied portion of the memory space will improve the usage efficiency of the memory space.

In an exemplary computer system, the host physical memory 303 is divided to many memory frames with fixed size for the convenience of management. Accordingly, in embodiments of the present disclosure, the memory space may comprise a chain of a plurality of memory frames. In step S402, when a memory portion is obtained from the memory space, at least one memory frame is obtained from the chain. The chain of the plurality memory frames may improve convenience of accessing by a processor or controller other than CPU.

Figure 5:
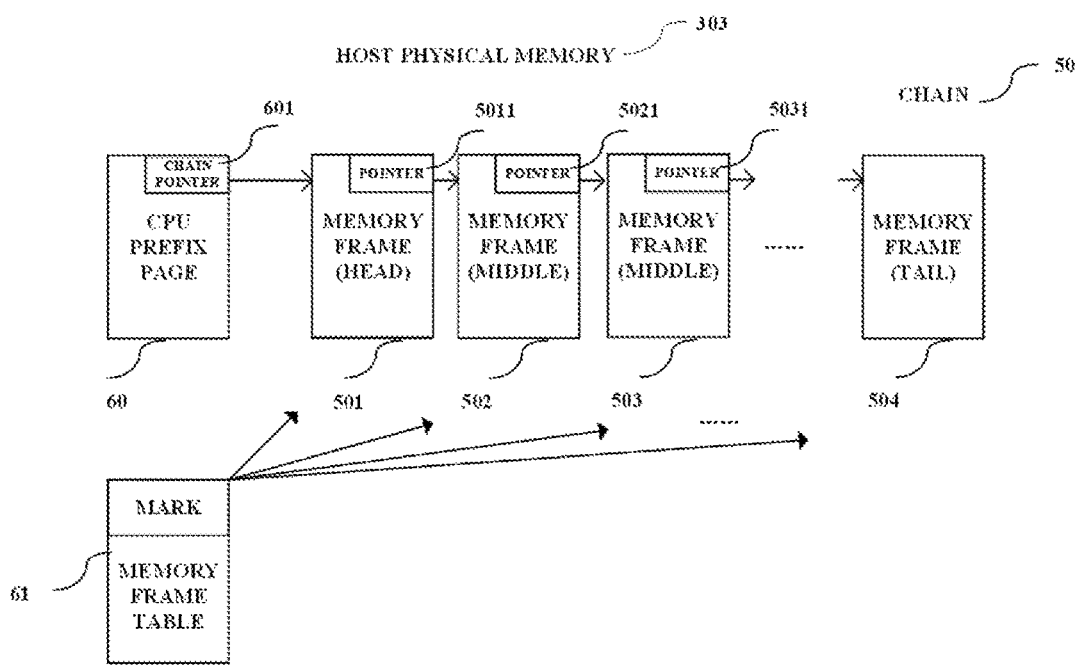
FIG. 5 is a diagram showing a chain of a plurality of memory frames allocated in step S401 in FIG. 4, according to an embodiment of the present disclosure.

FIG. 5 is a diagram showing a chain of a plurality of memory frames allocated in the step S401 in FIG. 4, according to an embodiment of the present disclosure. As shown in FIG. 5, in step S401, a CPU may allocate a plurality of memory frames to build a chain 50. The initialization size of the chain may be preset.

In embodiments of the present disclosure, a chain pointer 601 pointing to a head 501 of the chain 50 may be stored in a prearranged location in the host physical memory 303, such as in a CPU prefix page, to facilitate the access. In two adjacent memory frames in the chain, one memory frame comprises a pointer pointing to the other memory frame. Namely, each memory frame in the chain 50, except for a tail 504, includes a pointer to the next memory frame in the chain 50, such as pointer 5011 in the head 501, pointer 5021 in the middle 502, and pointer 5031 in the middle 503. A pointer to, or in, the chain may be architecture dependent, so as to further facilitate the access speed of the chain.

Further, the CPU may also mark the plurality of memory frames in the chain 50 in the memory frame table 61, to reserve these memory frames, such that they will not be used for other purpose.

Figure 6:
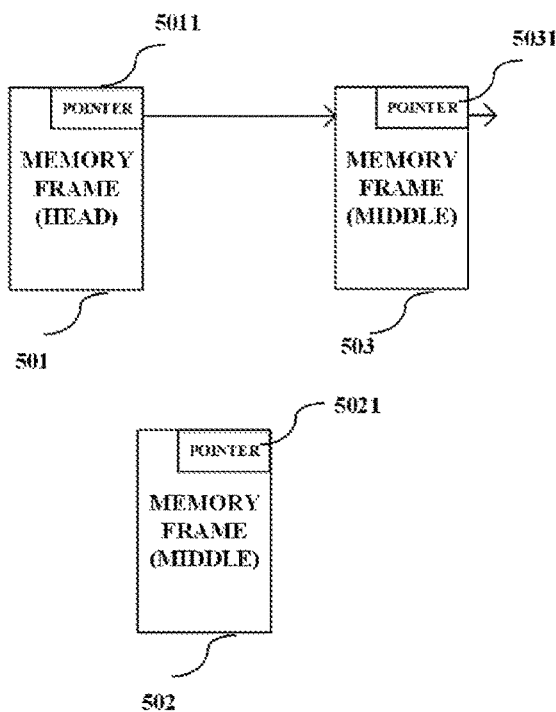
FIG. 6 is a diagram showing obtaining a free memory frame from the chain, according to an embodiment of the present disclosure.

FIG. 6 is a diagram showing obtaining a free memory frame from the chain, according to an embodiment of the present disclosure. In step S402 in FIG. 4 or FIG. 5, an assist controller may obtain a memory frame from the chain, in response to a request for building a shadow dynamic address translation table. For example, the request may be from a user' application with need for I/O operation with mass data exchange. As shown in FIG. 6, a memory frame 502 between memory frames 501 and 503 in the chain is taken out. The value of the pointer 5021 may be copied to the memory frame 501, which is previous to the memory frame 502. Then, the pointer 5011 in the memory frame 501 will point to the memory frame 503, which is next to the memory frame 502. It should be understood that any memory frame in the chain, including head, tail, may be taken out.

According to one embodiment of the present disclosure, more memory space may be allocated upon a predetermined criteria being met. In some instances, the chain may be empty. In response to that situation, a CPU may allocate more memory space, i.e. allocate and add a new memory frame to the chain 50. This process may be repeated until the number of the memory frames in the chain 50 reaches a preset value, or just fits the size of the shadow dynamic address translation table to be built.

If an assist controller executes the step S402 to obtain a memory frame from the chain 50, and finds out the chain 50 is empty, the assist controller may request the CPU to allocate and add a new memory frame to the chain 50. The CPU may be interrupted to handle that request timely. Alternatively, or additionally, the CPU may also periodically check if the chain 50 is empty in idle operation cycle actively, so as to reduce the times of being interrupted.

Figure 7:
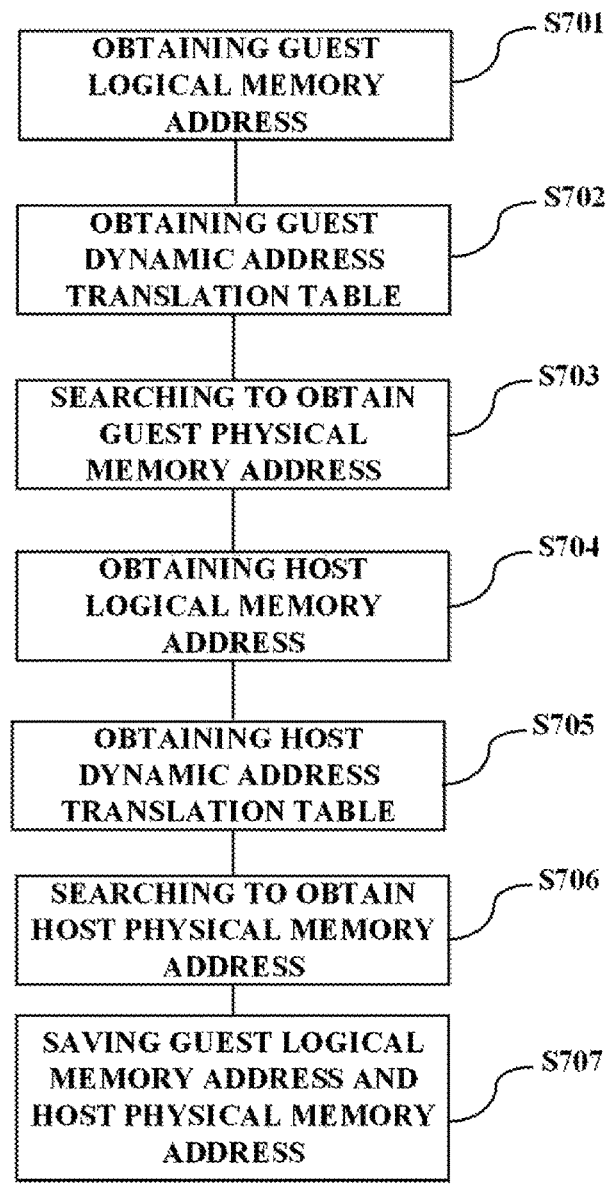
FIG. 7 is a flow chart of the process of building the shadow dynamic address translation table, according to an embodiment of the present disclosure.

FIG. 7 is a flow chart of the process of building the shadow dynamic address translation table, according to an embodiment of the present disclosure. Step S403, in FIG. 4, may also be executed by the assist controller. As shown in FIG. 7, step S403 may include steps S701-S707. In step S701, a guest logical memory address to be translated is obtained from the request of building a shadow dynamic address translation table. In step S702, a guest dynamic address translation table including mappings between guest logical memory addresses and guest physical memory addresses is obtained from a guest operation system. In step S703, the guest dynamic address translation table is searched with the guest logical memory address to obtain a guest physical memory address. In step S704, a host logical memory address is obtained based on the guest physical memory address. In step S705, a host dynamic address translation table including mappings between host logical memory addresses and host physical memory addresses is obtained from a host operation system. In step S706, the host dynamic address translation table is searched with the host logical memory address to obtain a host physical memory address. In step S707, a mapping between the guest logical memory address and the host physical memory address is saved in the shadow dynamic address translation table. For example, the guest logical memory address and the host physical memory address are both saved in corresponding positions in the shadow dynamic address translation table.

Figure 8:
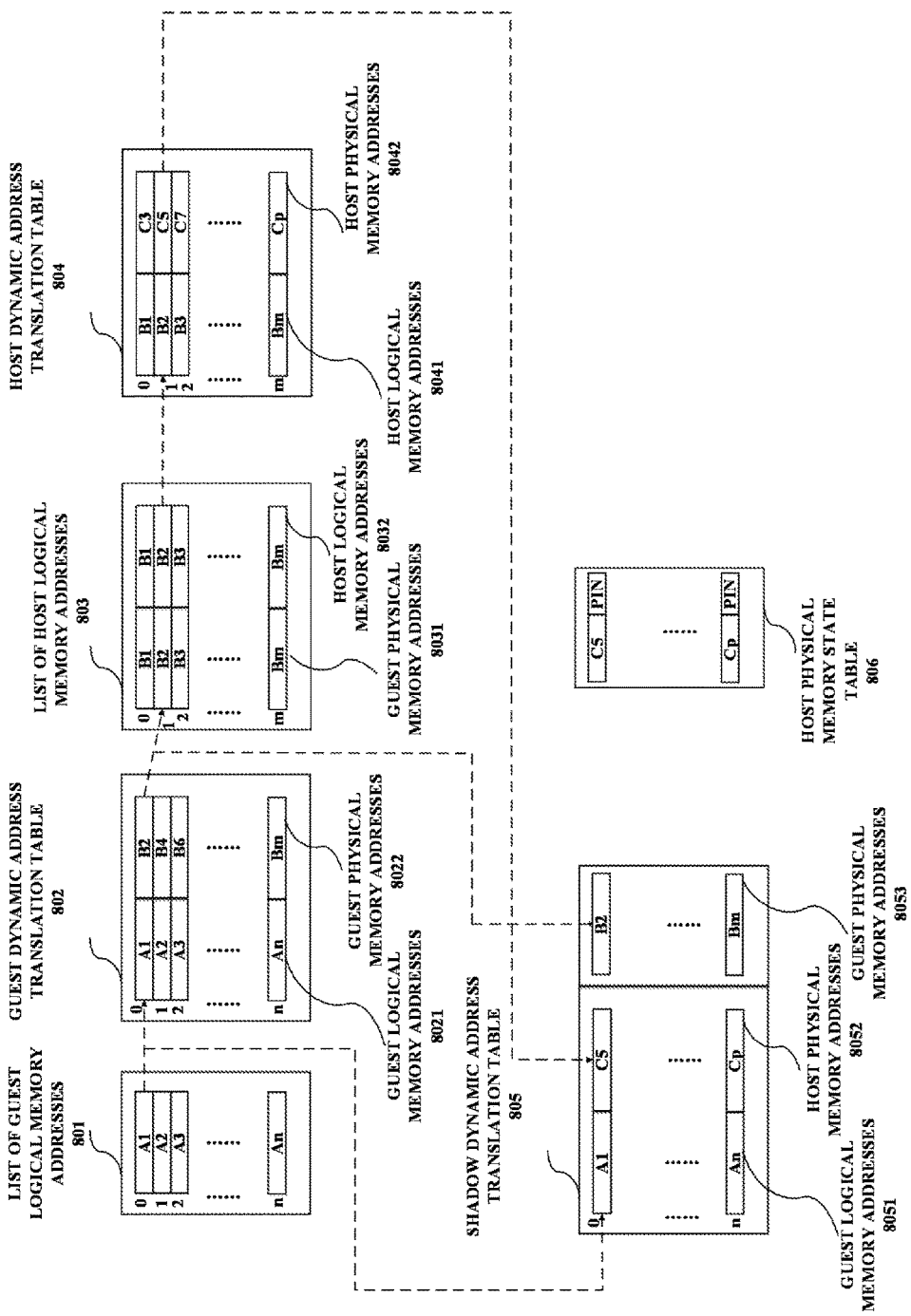
FIG. 8 is a diagram showing the data transmission when the shadow dynamic address translation table is built, according to an embodiment of the present disclosure.

FIG. 8 is a diagram showing the data transmission when the shadow dynamic address translation table is built, according to an embodiment of the present disclosure. As shown in FIG. 8, with a request for building a shadow dynamic address translation table from a user's application, a list of guest logical memory addresses 801 assigned with this request is also transmitted.

In step S701, for example, a guest logical memory address A1 to be translated is obtained, by the assist controller, from the list of guest logical memory addresses 801. The list 801 in FIG. 8 is used for better clarifying the process. In another exemplary embodiment of the present disclosure, the list 801 may be omitted. The assist controller obtains the guest logical memory address directly from the guest dynamic address translation table 802, since all the needed guest logical memory addresses are already stored in the guest dynamic address translation table 802.

In step S702, the assist controller obtains the guest dynamic address translation table 802. For example, for convenience of the obtaining by the assist controller, the guest operation system might resave the guest dynamic address translation table 802 in a memory where the assist controller can access, or just send to the assist controller a corresponding pointer/address of a memory where the guest dynamic address translation table 802 is stored.

In step S703, the assist controller searches the guest dynamic address translation table 802, specifically in a column of guest logical memory addresses 8021, to obtain a corresponding guest physical memory address B2, from a column of guest physical memory addresses 8022. The guest dynamic address translation table 802 in FIG. 8 also shows a general situation that, the guest logical memory addresses 8021 are continuous, while the guest physical memory addresses 8022 are assigned dynamically and uncontinuously. The mapping relationship shown in the guest dynamic address translation table 802 is also exemplary, since usually it is dynamical and unpredictable.

In step S704, the assist controller obtains a host logical memory address B2, which is the guest physical memory address B2 per se. In FIG. 8, an exemplary list 803 of the host logical memory addresses may be stored, wherein the guest physical memory addresses 8031 are the same in the value to the host logical memory addresses 8032.

In step S705, the assist controller obtains the host dynamic address translation table 804. The structure of the host dynamic address translation table 804, which is managed by the host operation system, is similar to the structure of the guest dynamic address translation table 802, which is managed by the guest operation system. The host logical memory addresses 8041 are continuous, while the host physical memory addresses 8042 are assigned discontinuously.

Similarly, the host operation system might resave the host dynamic address translation table 804 in a memory where the assist controller can access, or just send to the assist controller a corresponding pointer/address of a memory where the host dynamic address translation table 804 is stored. The re-saving of sending may be finished by the host operation system previously, thus, the host dynamic address translation table 804 may be obtained by the assist controller easily, without switching to the host state.

In step S706, the assist controller searches the host dynamic address translation table 804 with the host logical memory address B2 to obtain a host physical memory address C5.

In step S707, the assist controller saves the guest logical memory address A1 and the host physical memory address C5 in the shadow dynamic address translation table 805.

Finally, guest logical memory addresses 8051 and host physical memory addresses 8052 may be contained in the shadow dynamic address translation table 805.

Further, a mapping between the guest logical memory address and the guest physical memory address may also be saved in the shadow dynamic address translation table 805. For example, the guest physical memory address B2 may also be saved in the shadow dynamic address translation table 805. As a result, corresponding guest physical memory addresses 8053 may also be contained in the shadow dynamic address translation table 805. Therefore, changes made by the guest operation system to the mapping between the guest logical memory addresses and the guest physical memory addresses may be followed, and may be reflected to the shadow dynamic address translation table 805 timely when necessary.

The shadow dynamic address translation table 805 may be stored in one or more memory frames, such as the memory frame 502 shown in FIG. 7. Any authorized device or application, such as a DMA controller may access it. At the same time, the parts in the host physical memory corresponding to host physical memory addresses 8052 may be marked as pinned, so as to avoid being operated unexpectedly, especially avoid being swapped from memory onto the hard disk during a swapping process.

In some instances, if the host physical memory address C5 is invalid, then an error occurs and the process may be paused. The assist controller may generate an interruption, which will be handled by the CPU.

FIG. 8 is only an illustrative diagram, in which all the numbers, such as A1, B2, C5, are only exemplary for better clarifying the embodiment, and not the limitation to the embodiment. For example, since the guest logical memory addresses are not changed during transmission, their values may not be transmitted to and stored in the shadow dynamic address translation table 805, as long as the sequence order of their entry numbers, such as 0, 1, n, are maintained. Further, considering the security and/or the principle of memory management, the numbers such as C5 may also be entry numbers, which still need to be translated for the direct access to the hardware. In this situation, if C5 is a valid entry number, but the translated address is invalid, error may also occur and the process may also be paused.

Further, in step S405, in response to a request for destroying the shadow dynamic address translation table 805, which usually occurs after the usage of the shadow dynamic address translation table 805, the assist controller returns the memory frame 502 occupied by the shadow dynamic address translation table to the chain 50. The memory frame 502 may be added into any position of the chain 50, such as to the tail.

In embodiments of the present disclosure, a chain 50 including a plurality of memory frames is preassigned, to store shadow dynamic address translation tables, which contains the addresses of the host physical memories currently pinned. Thus, those pinned host physical memories, including those used as I/O buffers for DMA, may be managed unifiedly, so as to facilitate the management of the hardware resources, such as a statistical analysis of the memories. Further, the hypervisor 201 may adjust resources allocation strategy to the virtual machines based on the statistical analysis.

Figure 9:
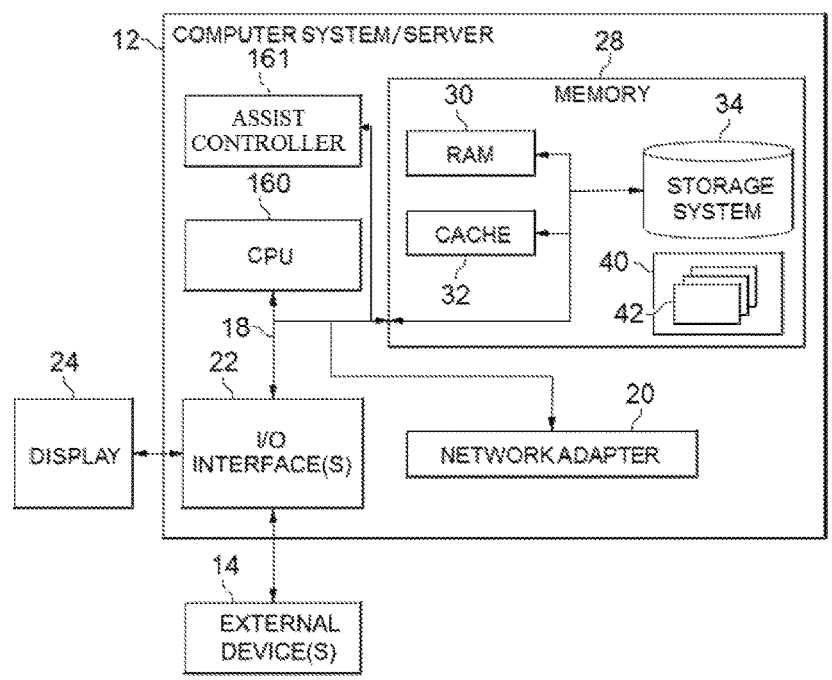
FIG. 9 is a block diagram showing another exemplary computer system which is applicable to implement some embodiments of the present disclosure, according to an embodiment of the present disclosure.
Figure 10:
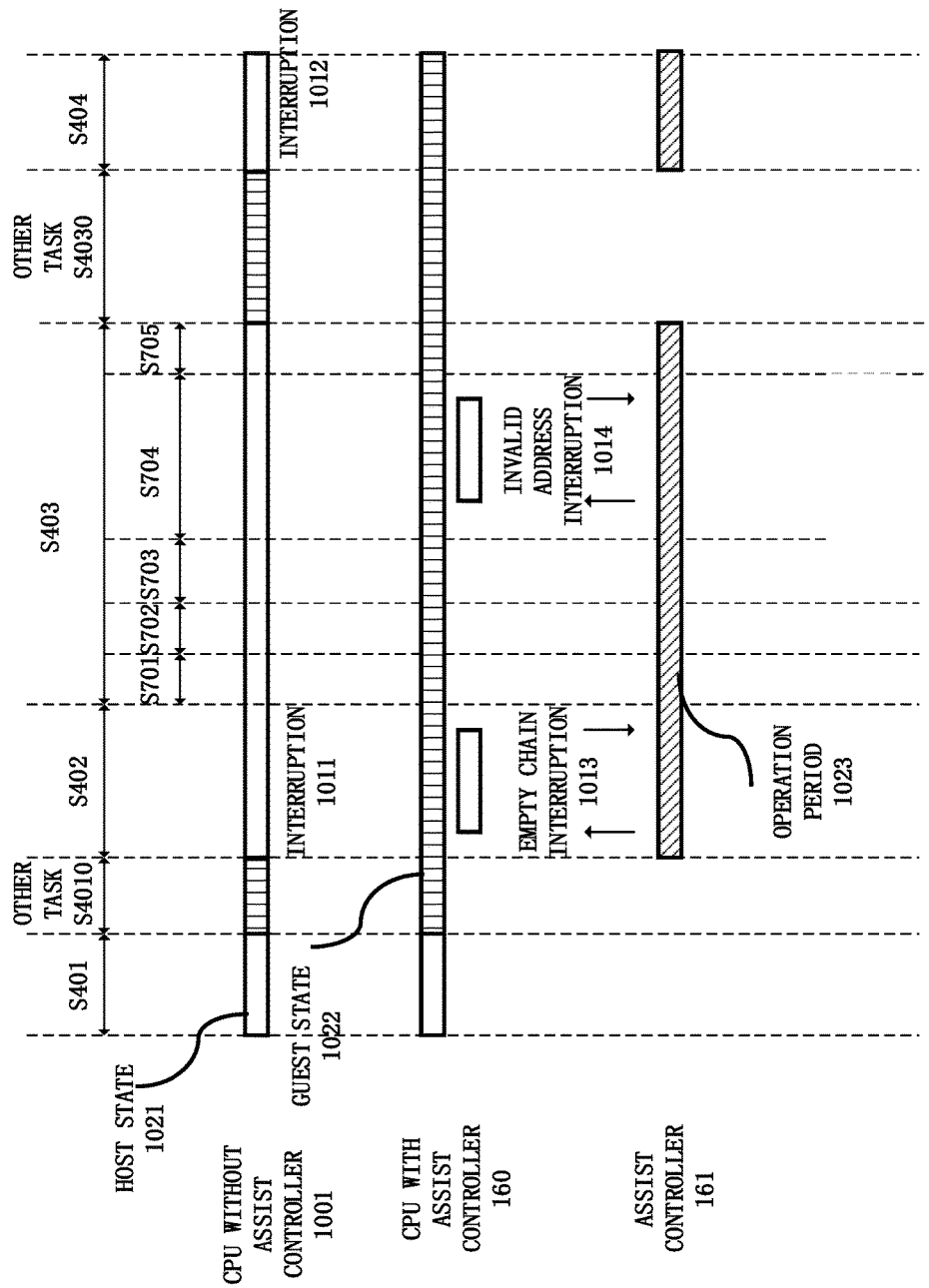
FIG. 10 is a diagram showing the cooperation between a CPU and an assist controller, according to an embodiment of the present disclosure.

FIG. 9 is a block diagram showing another exemplary computer system which is applicable to implement some embodiments of the present disclosure. As shown in FIG. 10, the computer system/server 12 further comprises an assist controller 161. A set of computer program instructions, corresponding to the program modules 42 contained in the program/utility 40, is stored in the memory 28 and executed by at least one of the processors, such as the CPU 160 in the processing unit 16, and the assist controller 161, in order to perform actions. In the actions, a memory space is allocated by the at least one of the processors. In response to a request for building a shadow dynamic address translation table, a memory portion is obtained from the memory space by the assist controller. The shadow dynamic address translation table includes a mapping between at least one guest logic memory address and at least one host physical memory address. The shadow dynamic address translation table is built by the assist controller. The shadow dynamic address translation table is stored in the memory portion by the assist controller. In response to a request for destroying the shadow dynamic address translation table, the memory portion occupied by the shadow dynamic address translation table is returned by the assist controller to the memory space. Briefly, the at least one of the processors may be the CPU 160 with high authorization and preforms most of the program instructions. The CPU 160 runs host operation system and guest operation system in computer system/server 12. The assist controller 161, which may be or may not be a processor in the processing unit 16, works to automatically build, refresh, and destroy a shadow dynamic address translation table. New hardware may be used for the assist controller, or existing hardware may be assigned and reprogrammed to function as the assist controller 161.

FIG. 10 is a diagram showing the cooperation between a CPU and an assist controller, according to an embodiment of the present disclosure. As shown in FIG. 10, without the assist controller 161, the CPU 1001 have to frequently change between in host/kernel state 1021, to run host operation system, and in guest state 1022, to run guest operation system. For example, whenever a request to build or refresh a shadow dynamic address translation table is received during S4010, in which the CPU 1001 runs the guest operation system, the CPU 1001 would be interrupted. S402 will be executed, and the CPU 1001 goes to host/kernel state 1021 to build or refresh the shadow dynamic address translation table. Similarly, whenever a request to destroy a shadow dynamic address translation table is received during S4030, in which the CPU 1001 runs the guest operation system, the CPU 1001 would be interrupted to go to host/kernel state 1021 again. The state change and its associated context switch are time-consuming, especially when a guest operation system frequently refreshes the shadow dynamic address translation table after every I/O operation and the CPU 1001 is interrupted repeatedly.

With the assist controller 161, the CPU 160 may continue tasks through S402, S403, S404, without being interrupted. Only in few cases, the CPU 160 may handle the empty chain interruption 1013 during S402, or the invalid address interruption 1014 during S704, in response to the request from the assist controller 161. The operation period 1023 of the assist controller 161 covers S402, S403, and S404, namely, the assist controller 161 may automatically build, refresh, destroy the shadow dynamic address translation table, so as to reduce the time cost of handling interruption by the CPU, such that the overall performance of the computer system/server may be improved.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   in response to a request for building a shadow dynamic address translation table, obtaining a memory portion from a memory space, wherein the memory space is allocated for at least one guest operation system, and wherein the shadow dynamic address translation table includes a mapping between at least one guest logic memory address and at least one host physical memory address;
   building the shadow dynamic address translation table, wherein building the shadow dynamic address translation table comprises:
      obtaining a guest logical memory address to be translated from the request of building the shadow dynamic address translation table;
      obtaining a guest dynamic address translation table including one or more mappings between one or more guest logical memory addresses and one or more guest physical memory addresses, from a guest operation system;
      searching the guest dynamic address translation table with the guest logical memory address to obtain a guest physical memory address;
      obtaining a host logical memory address based on the guest physical memory address;
      obtaining a host dynamic address translation table including one or more mappings between one or more host logical memory addresses and one or more host physical memory addresses, from a host operation system;
      searching the host dynamic address translation table with the host logical memory address to obtain a host physical memory address; and
      saving a mapping, between the guest logical memory address and the host physical memory address, to the shadow dynamic address translation table; and storing the shadow dynamic address translation table in the memory portion.

2. The computer-implemented method of claim 1, further comprising:
   in response to a request for destroying the shadow dynamic address translation table, returning the memory portion occupied by the shadow dynamic address translation table to the memory space.

3. The computer-implemented method of claim 1,
wherein the memory space comprises a chain of a plurality of memory frames;
wherein in two adjacent memory frames in the chain, one memory frame comprises a pointer pointing to an adjacent memory frame; and
wherein obtaining the memory portion from the memory space comprises obtaining at least one memory frame from the chain of the plurality of memory frames.

4. The computer-implemented method of claim 3, further comprising:
storing the pointer to a header of the chain of the plurality of memory frames.

5. The computer-implemented method of claim 1, further comprising:
pinning a part of host physical memory, pointed to by the host physical memory address.

6. The computer-implemented method of claim 1, wherein building the shadow dynamic address translation table further comprises:
saving a mapping between the guest logical memory address and the guest physical memory address to the shadow dynamic address translation table.

7. The computer-implemented method of claim 1, wherein additional memory space is allocated upon a pre-determined criteria being met.

8. A computer system comprising:
at least one processor;
an assist controller; and
a memory coupled to the at least one processor and the assist controller;
wherein a set of computer program instructions are stored in the memory and executed by the at least one processor and the assist controller, in order to perform actions of:
allocating a memory space for at least one guest operation system, by the at least one processor;
in response to a request for building a shadow dynamic address translation table, obtaining a memory portion from the memory space by the assist controller, wherein the shadow dynamic address translation table includes a mapping between at least one guest logic memory address and at least one host physical memory address;
building the shadow dynamic address translation table, by the assist controller, wherein building the shadow dynamic address translation table comprises:
obtaining a guest logical memory address to be translated from the request of building the shadow dynamic address translation table;
obtaining a guest dynamic address translation table including one or more mappings between one or more guest logical memory addresses and one or more guest physical memory addresses, from a guest operation system;
searching the guest dynamic address translation table with the guest logical memory address to obtain a guest physical memory address;
obtaining a host logical memory address based on the guest physical memory address;
obtaining a host dynamic address translation table including one or more mappings between one or more host logical memory addresses and one or more host physical memory addresses, from a host operation system;
searching the host dynamic address translation table with the host logical memory address to obtain a host physical memory address; and
saving a mapping, between the guest logical memory address and the host physical memory address, to the shadow dynamic address translation table; and
storing the shadow dynamic address translation table in the memory portion, by the assist controller.

9. The computer system of claim 8, further comprising:
in response to a request for destroying the shadow dynamic address translation table, returning the memory portion occupied by the shadow dynamic address translation table to the memory space, by the assist controller.

10. The computer system of claim 8,
wherein the memory space comprises a chain of a plurality of memory frames;
wherein in two adjacent memory frames in the chain, one memory frame comprises a pointer pointing to the other memory frame; and
wherein obtaining the memory portion from the memory space, by the assist controller, comprises obtaining at least one memory frame from the chain of the plurality of memory frames.

11. The computer system of claim 10, further comprising:
storing the pointer to a header of the chain of the plurality of memory frames, by the at least one processor.

12. The computer system of claim 8, further comprising:
pinning a part of host physical memory, pointed to by the host physical memory address, by the assist controller.

13. The computer system of claim 8, wherein building the shadow dynamic address translation table, by the assist controller, further comprises:
saving a mapping between the guest logical memory address and the guest physical memory address to the shadow dynamic address translation table.

14. The computer system of claim 8, wherein additional memory space is allocated, by the at least one processor, upon a pre-determined criteria being met.

15. A computer program product, comprising a computer readable storage medium having program instructions embodied therewith, wherein the computer readable storage medium is not a transitory signal per se; and
wherein the program instructions are executable by an assist controller to perform a method comprising:
in response to a request for building a shadow dynamic address translation table, obtaining a memory portion from a memory space, wherein the memory space is allocated for at least one guest operation system, and wherein the shadow dynamic address translation table includes a mapping between at least one guest logic memory address and at least one host physical memory address;
building the shadow dynamic address translation table, wherein building the shadow dynamic address translation table comprises:
obtaining a guest logical memory address to be translated from the request of building the shadow dynamic address translation table;
obtaining a guest dynamic address translation table including one or more mappings between one or more guest logical memory addresses and one or more guest physical memory addresses, from a guest operation system;
searching the guest dynamic address translation table with the guest logical memory address to obtain a guest physical memory address;

obtaining a host logical memory address based on the guest physical memory address;

obtaining a host dynamic address translation table including one or more mappings between one or more host logical memory addresses and one or more host physical memory addresses, from a host operation system;

searching the host dynamic address translation table with the host logical memory address to obtain a host physical memory address; and saving a mapping, between the guest logical memory address and the host physical memory address, to the shadow dynamic address translation table; and storing the shadow dynamic address translation table in the memory portion.

16. The computer program product of claim 15, further comprising:

in response to a request for destroying the shadow dynamic address translation table, returning the memory portion occupied by the shadow dynamic address translation table to the memory space.

17. The computer program product of claim 15, wherein the memory space comprises a chain of a plurality of memory frames;

wherein in two adjacent memory frames in the chain, one memory frame comprises a pointer pointing to the other memory frame; and wherein obtaining the memory portion from the memory space comprises obtaining at least one memory frame from the chain of the plurality of memory frames.

* * * * *